Aug. 25, 1964       H. E. McKELVEY         3,146,084
           METHOD OF BENDING GLASS SHEETS
                Filed March 18, 1958
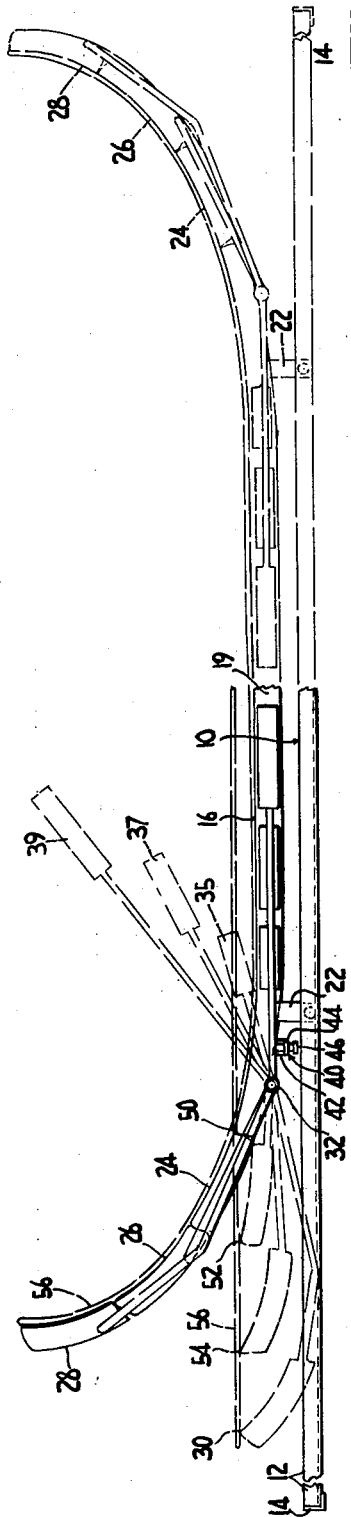
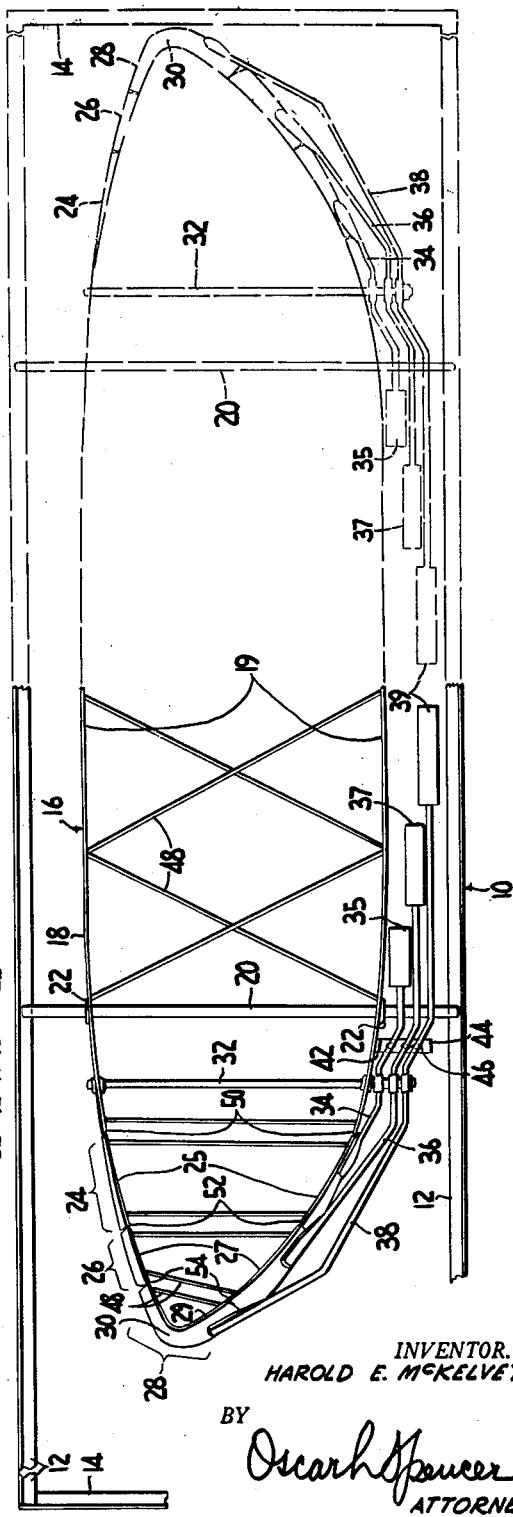
INVENTOR.
HAROLD E. McKELVEY
BY
Oscar L. Spencer
ATTORNEY

United States Patent Office 3,146,084
Patented Aug. 25, 1964

3,146,084
METHOD OF BENDING GLASS SHEETS
Harold E. McKelvey, Rural Valley, Pa., assignor to Pittsburgh Plate Glass Company, Allegheny County, Pa., a corporation of Pennsylvania
Filed Mar. 18, 1958, Ser. No. 722,199
4 Claims. (Cl. 65—107)

This application relates to treating glass sheets and specifically refers to improved bending molds of the female skeleton type designed especially for bending glass sheets to non-uniform curvatures. The molds described herein impart a comparatively shallow bend centrally of the glass sheets. The shallow bend merges into intermediate portions where the radius or curvature of the bends diminishes rapidly. The extremities of the glass are bent to such a degree that the tangent to the surface of the bent glass is rotated on the order of 90° from the tangent to the center of the glass.

Glass bending molds for bending flat glass sheets have been developed. Such molds comprise a center section and spaced wing sections flanking either longitudinal extremity of the center section. Each wing section is pivotable about an axis to a spread position to support a flat sheet of glass spanning the mold and rotatable into a closed position providing a continuous skeletonized surface having the desired contour of the bent glass. In such molds, the wing sections are normally urged into their closed mold position. Such molds were initially developed for bending relatively small sheets of glass into comparatively shallow cylindrical curves. Today, the requirements of automobile manufacturers demand larger sheets of glass shaped to very complex bends. These additional requirements bring out certain latent deficiencies in bending molds of the type previously acceptable for simple cylindrical bends.

According to the prior art, glass sheets are bent by heating them while supported in compression between stop members located at the extremities of the wing sections of the mold. The glass sheets while cold are rigid and behave as struts to maintain the stop members in the spread mold position. When heat is applied to the glass, the glass softens, and its resistance to the mold closing lessens. The mold sections move to the closed mold position. The heat softened glass moves to conform to the continuous skeleton structure resulting from closing the mold by a combination of heat sagging and mechanical force applied to the glass extremities by the stop members. The entire glass sheet is slid into alignment with the closing mold.

Unless both ends of the flat glass sheets sag and slide equally during the bending operation, the sheet may get out of alignment with the mold. In cases where it is desired to bend small glass sheets into cylindrical curves, any misalignment due to unequal sagging or unequal sliding, or both, does not affect the curvature of the finished product materially. However, when bending to complex curvatures is desired, any misalignment of the glass due to non-uniform sliding of the glass on the mold as the mold moves from open to closed position results in the formation of undesired curvatures in the glass due to the difference in size of the extremities of the misaligned glass. This error in curvature is magnified with larger sheets and more complex curvatures. Furthermore, another drawback of the type of mold which compresses a flat glass sheet at its extremities is that it is difficult to impress a non-uniform shape on the glass sheet.

In French Patent 1,089,973, various bending molds are disclosed. These bending molds comprising molding members of concave elevation including a central molding member fixed in position relative to a supporting frame and flanking molding members pivotable into a spread position where their longitudinal extremities are aligned with those of the fixed central molding member and cooperate to help support a flat glass sheet for bending. In bending glass sheets such molds utilize the principle of permitting the central portion of the glass sheet to sag and lifting the glass sheet extremities on the flanking sections of the mold to thereby impress the upper shaping surfaces of the flanking mold sections on the upwardly lifted heat softened glass sheet extremities.

This reference also discloses a five-member mold in which the inboard and outboard extremities of all the movable mold members provide support for a flat glass sheet to be bent in conjunction with the longitudinal extremities of the central mold section. Such construction fails to produce bending curves conforming exactly to the shape desired because different bending moments are required at the inboard and outboard extremities of each flanking mold section. At best, the net upward lifting forces applied to each flanking mold member represents a compromise between that required at its inboard extremity and that required at its outboard extremity.

The principle of resting a flat glass sheet as a beam on a spread, sectionalized mold and utilizing the combination of lifting the flanking portions of the glass sheet in coordination with the heat sagging of the central portion of the glass sheet is utilized in a more efficient manner by the present invention to provide a complex longitudinal bend to the glass. The present application utilizes a sectionalized bending mold comprising at least five molding members, each member provided with an upper shaping surface of concave elevation conforming to the shape desired for a different portion of the bent glass sheet, said members including a central molding member fixed in position relative to said support structure and flanking molding members rotatable relative to said central molding member into a closed mold position to provide a substantially continuous shaping surface conforming to the shape desired for the bent glass sheet.

Each flanking molding member is so constructed and arranged that its longitudinal outboard extremity only is aligned with the longitudinal outboard extremities only of the other molding members in a plane above the remainder of their upper shaping surfaces in a spread mold position to support a flat glass sheet for bending. Each flanking molding member has means providing a net rotational force operatively associated therewith, each of the last named means being so constructed and arranged to cause each flanking molding member to lift a portion of the heat softened glass sheet in a predetermined manner.

The latter means constitute moment arms and counterweights, the construction of which is so chosen to provide localized control for the upward folding of each portion of a glass sheet to be bent to a complex bend. The net upward lifting force chosen for each molding member can be the exact force needed for the increment of glass outboard of the next inboard flat glass support rather than a compromise between that required at the inboard support and that required at the outboard support. The number of flanking mold members used depends on the complexity of the bend and how rapidly the bend changes from increment to increment along the length of the sheet. To facilitate construction, the flanking molding members are arranged in sets flanking each longitudinal extremity of the central molding member and a common pivot axis is provided for each set of flanking molding members and their associated lever arms.

The invention will be understood more clearly after studying the following description of a particular embodiment of the present invention, of which the accompanying drawings form a part.

With reference to the drawings, wherein like reference numbers are applied to like structural elements, FIGURE 1 is a longitudinal elevational view of a bending mold constructed according to the present invention in its closed mold position, with half the mold shown in phantom and including a phantom depiction of half the mold in its open position supporting a flat sheet of glass; and FIGURE 2 is a plan view of the mold seen in FIGURE 1 in its closed mold position.

A typical embodiment of the present invention includes a support structure, shown generally by reference number 10, which constitutes spaced longitudinal angle irons 12 interconnected by spaced transverse angle irons 14. The latter are supported on rolls of a conveyor (not shown) for transporting the mold and a supported glass sheet laterally for bending through a tunnel-like bending lehr in accordance with a technique well known in the glass bending art.

A glass bending mold 16 is supported on the support structure 10. The mold includes a central molding member 18 comprising a pair of spaced, longitudinally extending rails 19 each provided with an upper shaping surface of concave elevation conforming to the shape desired for the central portion of the bent glass sheet. Cross bars 20 interconnect the spaced rails 19 through uprights 22.

Flanking the longitudinal extremities of the central molding member 18 are flanking molding members 24 each provided with spaced longitudinally extending rails 25 which have an upper shaping surface of concave elevation conforming to the shape desired for the flanking portions of the bent glass sheet immediately outboard of the center portion. Additional flanking molding members 26 comprising spaced longitudinally extending rails 27, each having an upper shaping surface of concave elevation conforming to the shape desired for the portions of the bent glass sheet immediately outboard of the portions previously described are located immediately outboard of the flanking molding members 24. An additional flanking molding member or endmost molding member 28 comprising a reversely curved rail having a pointed extremity 30 offset with respect to the longitudinal center line of the mold and having an upper shaping surface conforming to that of the longitudinal extremities of the glass sheet is located outboard of flanking molding members 28.

The flanking molding members 24, 26 and endmost molding members 28 are arranged in sets on either side of the longitudinal extremities of the central molding member 18. The flanking and endmost molding members of each set may be pivoted about a common pivot axis provided by a transverse rod 32. In order to pivot each flanking molding member about the common pivot axis, flanking molding member 24 is provided with a crooked moment arm 34 having a counterweight 35 at its inboard extremity, flanking molding member 26 is provided with a crooked moment arm 36 having a counterweight 37 at its inboard extremity and endmost molding member 28 is provided with a crooked moment arm 38 having a counterweight 39 at its inboard extremity. Each of the crooked moment arms 34, 36 and 38 makes bearing contact with the transverse pivot rod 32.

A stop member 40 constructed of a downwardly depending flange 42 and a horizontally extending apertured flange 44 and a series of set screws 46 serves as stop members for preventing excessive rotation of each of the crooked moment arms 34, 36 and 38, thus limiting the rotation of the flanking molding members 24 and 26 and endmost molding members 28 to positions wherein the molding members 18, 24, 26 and 28 provide through their rails a substantially continuous upper shaping surface conforming in elevation and outline to the ultimate shape desired for the bent glass sheet.

Each of the molding members is given structural rigidity by means of transversely extending bracing members 48 interconnecting opposing rails 19, 25, 27 and the converging portions 29 of the endmost mold sections 28.

Reference number 50 refers to the longitudinal outboard extremities of the central molding member rails 19, reference number 52 refers to the longitudinal outboard extremities of the flanking molding member rails 25 and reference number 54 refers to the longitudinal outboard extremities of the flanking molding member rails 27. As seen in the phantom portion of FIGURE 1, when a flat glass sheet 56 is mounted for bending on a sectionalized bending mold, it is supported at the longitudinal outboard extremities 50 of the rails 19, the longitudinal outboard extremities 52 of the rails 25, the longitudinal outboard extremities 54 of the rails 27 and the converging portions 29 of the endmost mold members 28 at the pointed extremities 30 of the mold.

As the glass sheet is conveyed while mounted on the mold through a bending lehr where the glass temperatures increase to the softening point, the glass sheet, which had sufficient mass in its flat, rigid condition to counterbalance the exclusive net force provided by the counterweights 35, 37 and 39 to tend to lift the flanking molding members 24 and 26 and endmost mold members 28, respectively, begins to soften. As the glass sheet softens, a net upward lifting force is provided through the outboard longitudinal extremities 52 of rails 25, longitudinal extremities 54 of rails 27 and the pointed extremity 30 of the reversely curved rail. Therefore, the softened glass sheets are lifted in the regions requiring severe bending at a plurality of spaced thrust points, the number and spacing of the points being dependent upon the severity of the bending in the localized portions to be bent.

The relative masses of the counterweights 35, 37 and 39 and the relative lengths of the crooked moment arms 34, 36 and 38 are so chosen as to cause the different portions of the glass sheet to be lifted about the common pivot axes 32 at such rates relative to each other that each portion of the sheet follows a time cycle for bending that fits into the pattern for the entire sheet to cause each portion of the entire sheet to reach its final curved contour substantially simultaneously.

While a mold provided with seven molding members has been depicted, it is readily understood that the number of molding members may be increased or decreased depending upon the severity of bend and the rate of change of radius of curvature in various localized portions of the glass sheet bend. For complex bends, the present invention requires a minimum of five molding sections comprising a central molding member plus two sets of two flanking molding members each with each flanking molding member actuated by a separate means providing an independent and exclusive net rotational force to lift each flanking molding member at a rate necessary for lifting the localized portion of the glass sheet supported outwardly of the next inboard molding member. Since all the molding members are concave in elevation, the flat glass sheet is supported at a series of spaced supports located at the outboard extremities of the molding members and above the remainder of the mold shaping surface. Upward lifting forces are applied simultaneously to the glass through the plurality of supports. Proper choice of the lifting force to be applied to each increment of glass is simplified because it is not necessary to compensate for the effect of lifting the glass by the inboard extremity of each mold member as in the prior art. The upward lifting force applied through each mold member is independent and exclusive of those applied through each other mold member. Therefore, any complicated pattern can be facilitated by proper choice of net upward lifting forces to apply to each longitudinal increment of the glass sheet. When the bends are complicated, the lifting force applied to one increment on either side of the center of the sheet differs from that applied to another increment on the same side of the center of the sheet.

While a particular embodiment of the present invention has been disclosed, it is understood that various changes may be made in the light of the present disclosure without departing from the spirit of the present invention. For example, each of the flanking and endmost molding members may be made rotatable about a separate axis of rotation provided each of the movable molding members supports the flat glass sheet at its outboard extremity only. Thus, a plurality of independent and mutually exclusive localized lifting thrusts are applied simultaneously to localized portions of the heat-softened glass sheet to facilitate its bending to very complex curvatures.

What is claimed is:

1. In the method of bending glass sheets to complex curvatures by supporting a flat glass sheet above the shaping surface of a bending mold, heating the glass sheet to its softening point, and conforming the shape of the glass sheet to that of the shaping surface of the bending mold by a combination of heat sagging and applying a plurality of upward lifting forces to different longitudinal increments along the marginal portion only of a heat-softened glass sheet on either side of the longitudinal center of the sheet, the improvement comprising applying an exclusive upward lifting force to each said longitudinal increment only.

2. The improvement according to claim 1, wherein the lifting force applied to one increment on either side of the longitudinal center of the sheet differs from that applied simultaneously to another increment on the same side of the longitudinal center of the sheet.

3. In the method of bending glass sheets to complex curvatures by supporting a flat glass sheet above the shaping surface of a bending mold, heating the glass sheet to its softening point, and conforming the shape of the glass sheet to that of the shaping surface of the bending mold by a combination of heat sagging and applying upward lifting forces along the margin only of the glass sheet, the improvement comprising supporting the flat glass sheet adjacent the longitudinal outer extremities only of a plurality of longitudinal increments extending in end to end relation from the longitudinal center of the sheet to each longitudinal extremity thereof, and simultaneously applying an upward lifting thrust at each of said supported portions of the heat-softened sheet longitudinally outwardly of the innermost longitudinal increment, the upward lifting thrust applied to each longitudinal outer extremity of each said increment being exclusive of that applied to each other longitudinal outer extremity of each other increment.

4. The improvement according to claim 3, wherein the lifting force applied to one increment on either side of the longitudinal center of the sheet differs from that applied simultaneously to another increment on the same side of the longitudinal center of the sheet.

References Cited in the file of this patent

UNITED STATES PATENTS

| | | |
|---|---|---|
| 760,959 | Commington | May 24, 1904 |
| 2,223,123 | Owen | Nov. 26, 1940 |
| 2,239,546 | Black | Apr. 22, 1941 |
| 2,350,915 | Miller | June 6, 1944 |
| 2,392,770 | Ryan et al. | Jan. 8, 1946 |
| 2,774,189 | Jendrisak | Dec. 18, 1956 |
| 2,798,338 | Jendrisak | July 9, 1957 |
| 2,805,520 | Black | Sept. 10, 1957 |
| 2,814,164 | Carson et al. | Nov. 26, 1957 |
| 2,857,713 | Cleminson | Oct. 28, 1958 |
| 2,861,396 | Richardson | Nov. 25, 1958 |

FOREIGN PATENTS

| | | |
|---|---|---|
| 1,089,973 | France | Oct. 13, 1954 |